July 10, 1945.  L. A. CUNDALL  2,380,221
METAL BELT GUIDING MECHANISM
Filed Dec. 12, 1942
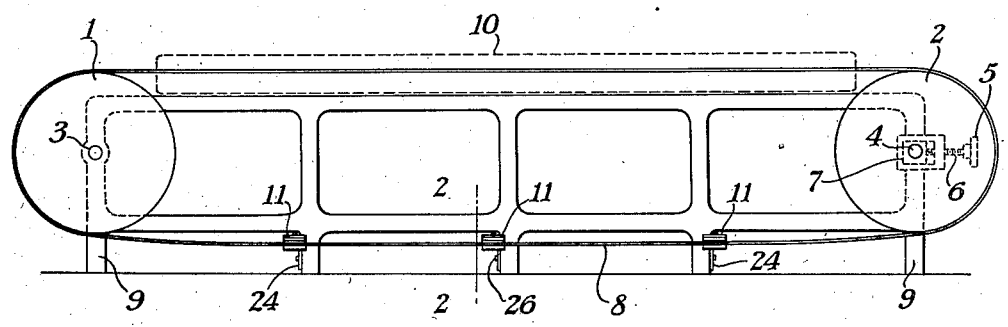
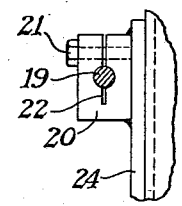
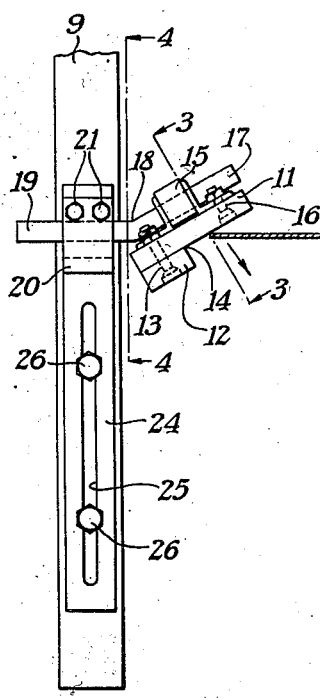
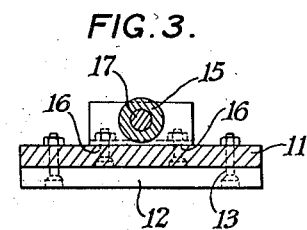
LINCOLN A. CUNDALL
INVENTOR
BY
ATTORNEYS Patented July 10, 1945

2,380,221

UNITED STATES PATENT OFFICE 2,380,221

METAL BELT GUIDING MECHANISM

Lincoln A. Cundall, Rochester, N. Y., assignor to Eastman Kodak Company, Rochester, N. Y., a corporation of New Jersey Application December 12, 1942, Serial No. 468,836

4 Claims. (Cl. 74—241)

This invention relates to machines employing long continuous metal belts and particularly to a means for guiding these belts through a relatively fixed path. Metal belts, supported on two or more cylinders have been used for a variety of purposes, such as receiving thin layers of various materials which may be flowed onto the belt and dried thereon, or for receiving coatings for drying or processing, such as gelatin or glue. The belts may be used for forming various types of thin films, such as sheets or films of a polymeric plastic material such as cellulose derivatives, resins or the like.

It has been difficult to provide relatively long belt machines with a mechanism which would satisfactorily guide a belt through a relatively fixed path and which would not damage the thin metal edge of the belt. Such belts may be quite long (perhaps 100 to 300 feet) and they may be made of relatively thin metal, such as nickel, stainless steel or other suitable metal of from .020 to .050 of an inch in thickness. The width may be from three to six feet. These dimensions are given purely by way of illustration to assist in visualizing the difficulty of properly guiding the belts and are not restrictive.

The belts may be looped around a pair of spaced drums so that as the belt moves these drums turn and, no matter how accurately the axes of the drums may be aligned, there appears to be a tendency for the belt to creep in one direction or the other out of the path through which it is desirable for the belt to pass.

One of the objects of my invention is to provide a simple and inexpensive type of belt guide which does not tend to distort or mar the edges of the belt and yet one which will guide the belt through approximately the same path. Another object of my invention is to provide a series of belt guides which exert light pressure in a downward and inward direction upon the edges of a lower catenary of the belt to guide the belt through its path. Other objects will appear from the following specification, the novel features being particularly pointed out in the claims at the end thereof.

Coming now to the drawing in which like reference characters denote like parts throughout:

Fig. 1 is a schematic view of a metal belt machine which may be provided with a belt guiding means embodying a preferred form of my invention;

Fig. 2 is an enlarged fragmentary view showing the belt in cross section and illustrating the relation of the belt guides to the belt in normal operation;

Fig. 3 is a section on line 3—3 through one of the belt guides; and

Fig. 4 is a fragmentary side elevation of a belt guide holding clamp.

My invention consists broadly in providing a machine in which there are a pair of cylinders or drums 1 and 2 which may rotate about normal parallel axes 3 and 4. I prefer to provide a means for moving the axle 4 to or from the axle 3, this mechanism being diagrammatically illustrated as comprising a hand wheel 5 operating a screw 6 which moves a bearing block 7, carrying the shaft 4 to and from the shaft 3. While for the purpose of illustration a hand wheel is shown, it is customary to move the axle and one drum in parallel relation to the axis of the other drum by means of power, but, since a movement of these parts does not constitute a part of my present invention, the diagrammatic illustration may be considered sufficient.

A thin metallic belt 8 in an endless loop is passed around the drums 1 and 2 and there may be a frame 9 supporting the drums, and if desirable a processing chamber 10, all as diagrammatically illustrated in Fig. 1.

The frame 9 is provided with belt guiding shoes 11 at spaced intervals along the machine. The number and spacing of these shoes depends somewhat on the length of the metal belt and, although it is usually possible to use a single pair of guiding shoes 11, it is usually more convenient to provide more than one pair of shoes for this purpose.

Each guiding shoe consists of a major belt engaging member 11 and a minor belt engaging member 12 attached thereto as by means of bolts 13 so that the shoe as a whole may be considered as being L-shaped in cross section, the two belt engaging members meeting at an angle 14 which may be conveniently arranged at right angles.

It is desirable to have these shoes made of a material which is definitely softer than the material of which the belt is made, so that there will be no tendency for the shoes to cut or mar the relatively thin edges of the metal belt. Certain impregnated woods may be used, but I prefer to make these shoes of a phenolic product, since this material is relatively tough and strong and since it is materially softer than the metal of the belt. A preferred material for the shoes is a solid sheet material produced by the application of heat and pressure upon layers of paper or fabric impregnated with an artificial resin to produce a sheet material which has proved suitable for applicant's purpose.

The shoes are supported by means of a bearing block 15 which may be attached by bolts 16 to the shoe, which bearing block may encircle a supporting rod 17 preferably bent at an angle 18 from a rod portion 19 supported in a clamp 20 when the screws 21 are tightened to pinch the rod 19 through the contraction of the slot 22 as indicated in Fig. 4.

The clamping or pinch block 20 may be carried by a supporting bar 24 slotted at 25 so that it may be held in a set position by means of the screws 26. I prefer to normally provide the supporting bars 17 so that the shoes may rock about that portion 17 of the supporting rods which extends angularly to the belt and over the edges thereof. If these parts are arranged as indicated in the drawing at an angle of substantially 30° to the belt, they tend to press the edges of the belt downwardly and toward the center with a relatively light pressure. Thus, these two shoes tend to cause the belt to seek a path which is determined by the position of the shoes and the position of the belt engaging the shoes.

In practice the drums 1 and 2 may be set in a desired relationship to cause the belt 8 to lie in the proper position with respect to the frame 9 of the machine. The center pair of shoes may then be positioned by altering the adjustment between the screws 26 and the slotted bars 24 in such a manner that the upper edges of the belt will be engaged by the surfaces of the shoes as shown in Fig. 2. If more than one pair of shoes are employed, the others may be adjusted in the same manner in each case pressing the shoes with relatively light pressure upon the belt.

Since the shoes may turn about their supporting rods 17 they may adjust themselves to the inclination of the catenary or lower run of the belt at the point where they engage the belt.

As the machine runs the shoes may rock slightly about their supporting rod 17 but they will soon reach a state of equilibrium in which they will ride smoothly on the edges of the belt and in which they will guide the belt with a reasonable degree of accuracy through the proper path. The belt may move small fractions of an inch from this path, but when the parts are all properly aligned, there will be very little divergence of the belt from a fixed path.

If the belt should move too far from its normal path the edges would engage the corner of the angularly disposed members 11 and 12 and further movement of the belt in that direction would be prevented. However, in normal running only light contact between the major belt engaging surfaces 11 and the edges of the belt are required and apparently the shoes do not tend to mar the edges of the belt or to damage them in any way. The shoes are relatively inexpensive and if they should show signs of wear it is a simple matter to slide off one shoe and replace it with a fresh one.

I am aware that a good many patents have been taken out on mechanical means for automatically guiding a belt in which the angle of the axis of the belt supporting drums may be altered or guiding rollers may be contacted with portions of the belt in order to change its path and, while no doubt some of these devices may work satisfactorily, it frequently happens that such devices tend to place more strain on one edge of the belt than another and, consequently, such devices may ultimately stretch one side of the belt relative to the other so that it becomes more and more difficult to guide the belt and so that the belt itself may be seriously damaged. It has also been found that the members contacting with and guiding a belt very frequently cause the edges of the belt to become rolled up or thickened so as to disturb the extreme edges of the belt, distorting them somewhat from a flat plane in which it is desirable to maintain the surface of a film receiving belt.

My improved edge guides are not only far more simple than the various complicated mechanical and often automatic means for guiding belts, but they apparently do the work in a more satisfactory manner; they are inexpensive and they, so far as applicant can see at the present time, have absolutely no tendency to mar, stretch or damage the belt in any way.

While I have described a preferred form of my invention, I desire to point out that the exact shape and arrangement of parts and the number of guiding shoes are not critical but can be varied without departing from my invention. I do prefer to have the shoes engage the belt edges in the manner illustrated but the exact angle of the shoes to the belt is also not critical as long as the shoes tend to press slightly inwardly and downwardly upon the edges of the belt.

It appears to be much easier to guide a belt by applying an edge pressure in this manner than it is to guide a belt by a guide member arranged at right angles to the surface of the belt because no doubt the downward and inward pressure tends to swing the catenary with a minimum of pressure; whereas the guide member at right angles to the belt forms too rigid an abutment and must be fitted too close to the edges of the belt to allow the necessary play for possible inequalities of the belt width throughout its length. I, therefore, consider as within the scope of my invention all such forms as may come within the scope of the appended claims.

I claim:

1. In a machine of the type in which a long metal belt is supported on a pair of spaced drums for receiving films or coatings, the combination with the said belt and supporting drums, of means for guiding the belt through a fixed path about and between said drums comprising an edge guide for the belt including a pair of shoes spaced apart approximately the width of the belt and arranged at an angle to the surface thereof each of said shoes having a metal belt contacting surface of a material softer than the material of which said metal belt is made, a pivotal support for each guide on which said guide may move relatively to the edge of the belt, said pivotal support including a bent rod extending substantially parallel to the width of said belt and then being bent upwardly and at an angle thereto.

2. An edge guide for belt machines of the type in which a pair of spaced parallel drums support a long metallic belt in position to receive a film or coating, said edge guide comprising a hingedly mounted shoe L-shaped in cross section the angle of the shoe with respect to the surface of the belt being less than ninety degrees.

3. An edge guide for belt machines of the type in which a pair of spaced parallel drums support a long metallic belt in position to receive a film or coating, said edge guide comprising a hingedly mounted shoe having a major belt engaging member and a minor belt engaging member angularly disposed with respect to each other to form a corner between the members, said major belt engaging member normally slidably engaging the belt tending to lightly press downwardly and toward the center thereof.

4. An edge guide for belt machines of the type in which a pair of spaced parallel drums support a long metallic belt in position to receive a film or coating, said edge guide comprising a hingedly mounted shoe having a major belt engaging member and a minor belt engaging member angularly disposed with respect to each other to form a corner between the members, said major belt engaging member normally slidably engaging the belt tending to lightly press downwardly and toward the center thereof, a hinge element carried by the major belt engaging member, and a hinge pintle carrying said hinge element arranged substantially parallel to the major belt engaging member permitting free movement of the edge guide about said hinge.

LINCOLN A. CUNDALL.